Patented Aug. 9, 1938

2,126,488

UNITED STATES PATENT OFFICE 2,126,488

METHOD OF INCREASING THE VISCOSITY OF ORGANIC ACID ESTERS OF CELLULOSE

Carl J. Malm, Rochester, N. Y., assignor, by mesne assignments, to Eastman Kodak Company, Jersey City, N. J., a corporation of New Jersey No Drawing. Application May 7, 1936, Serial No. 78,447

6 Claims. (Cl. 260—102)

The present invention relates to increasing the viscosity of lower fatty acid esters of cellulose by incorporating therein the salt of an alkaline earth metal by thoroughly moistening the ester with a dilute solution of the salt and drying.

In the past it has been thought that the relative viscosity of cellulose compounds was a measure of the degradation of the cellulose; the more degraded the cellulose, the lower the viscosity. Viscosity measurements have, in fact, been used to estimate the molecular weight of the cellulose ester. I have found, however, that the viscosity of cellulose esters may be increased by the incorporation of a minute amount of an alkaline earth metal salt into the ester without any effect whatever upon the cellulose itself. The manufacture of high viscosity cellulose esters is more expensive due to the large amounts of solvents necessary in the esterification mixture in order to be able to handle the solution of the resulting ester.

The object of my invention is to provide a method of increasing the viscosity of cellulose esters without changing the cellulose so that the viscosity of a cellulose ester may be satisfactory in spite of its low original viscosity. By my process a low viscosity ester can be produced and its viscosity later raised to the desired point.

I have found that when the calcium content of a hydrolyzed cellulose ester is increased the resulting product will exhibit a greatly increased acetone viscosity so that it may be employed for a purpose for which a high viscosity ester is adapted and for which the original material because of its low viscosity was unsuitable. For instance, if in the preparation of a cellulose ester, a product is obtained having a viscosity lower than desired, the ester may be brought up to the desired viscosity merely by soaking it in a very dilute aqueous solution of an alkaline earth metal salt, such as calcium carbonate, removing the excess solution and drying. The resulting product has a much higher viscosity than that possessed by the ester before treatment.

The degree of increase in the viscosity of a cellulose ester upon treatment with a dilute solution of an alkaline earth metal salt depends principally upon two factors:

1. The concentration of the alkaline earth metal salt in the water with which the ester is soaked, and
2. The degree of hydrolysis of the ester.

I have found that if the ester, for instance cellulose acetate, has been hydrolyzed below about 41% acetyl, the viscosity thereof begins to increase greatly upon treatment with the calcium salt solution as the acetyl content decreases.

An example of the procedure which may be employed for increasing the viscosity of a cellulose ester is as follows:

15 grams of the hydrolyzed cellulose ester is placed in 3 liters of distilled water containing the desired quantity of alkaline earth metal salt to impart increased viscosity and the mixture is stirred for approximately 15 minutes at room temperature. At the end of this time, the solution may be drained from the ester and the ester centrifuged, for instance, for about 2 minutes. After drying the ester at an elevated temperature, such as about 145° F., a product having an increased viscosity is obtained. This product may then be dissolved up in a solvent, such as acetone, and employed for making various commercial products.

I have found that the highly hydrolyzed esters are particularly susceptible to elevation of their viscosity by this treatment. For instance, a highly hydrolyzed cellulose acetate propionate, which has an original viscosity of about 155 seconds when soaked in water containing 300 parts per million of calcium chloride, exhibits a viscosity of approximately 225 seconds. When soaked in a 600 parts per million solution of calcium chloride the acetone viscosity of the ester is raised to more than 400 seconds.

A hydrolyzed cellulose acetate butyrate, having an acetone viscosity of approximately 150 seconds when soaked in a 300 parts per million calcium chloride solution, exhibited a viscosity of nearly 300 seconds. If soaked in a 600 parts per million solution a viscosity of approximately 435 seconds is obtained. A cellulose acetate, having an original viscosity of approximately 100 seconds when soaked in a 7 parts per million calcium carbonate solution, centrifuged and dried, as described, exhibited a viscosity of 210 seconds and when a 30 parts per million calcium carbonate solution was used instead, the ester had a viscosity of 300 seconds. A cellulose acetate, which originally had a viscosity of 100 seconds when soaked in a solution of calcium carbonate containing only 3 parts per million of the carbonate, exhibited a viscosity of 150 seconds. Thus it may be seen that when cellulose esters are treated with a solution of an alkaline earth metal salt, the viscosity of the acetone solution of that ester is markedly increased.

I have found that, if instead of incorporating the calcium salt into the ester in this washing step, the calcium salt is dissolved in the acetone solution in which the cellulose ester is dissolved, the desired effect is not obtained but rather the resulting solution has substantially the same viscosity as it had originally.

It was also found that the increase of viscosity in the treatment of cellulose esters with a solution of an alkaline earth metal salt varies with the temperature of treatment and the volume of solution employed, however, these variations are not important as the change in viscosity is not appreciably altered in those cases.

The increase in viscosity of the ester by treatment with alkaline earth metal salts also depends upon the degree of hydrolysis of the ester which is treated. For instance, a cellulose acetate, having an acetyl content of 42.3%, had an original viscosity of 62 seconds and a viscosity, after treatment in a .1% solution of calcium chloride, of 70 seconds. When the acetate was hydrolyzed to 41.4%, the original viscosity is 71 seconds and the viscosity after treatment with a .1% solution of calcium chloride is 81 seconds. In the case where the ester was hydrolyzed down to an acetyl content of 40.7%, the original viscosity was 91 seconds and viscosity was increased to 160 seconds by the calcium chloride treatment. When the ester was hydrolyzed to an acetyl content of 40%, the viscosity was increased from 136 seconds to 492 seconds by the calcium chloride treatment. The treatment with calcium chloride was performed by stirring 20 grams of the hydrolyzed ester for 15 minutes at room temperature in 3 liters of a .1% solution of calcium chloride. The acetate was then removed, centrifuged for 2 minutes and dried.

The phenomena of my invention also holds true in the case of other fatty acid esters of cellulose which have been hydrolyzed, such as cellulose acetate propionate, cellulose acetate butyrate or the simple esters, such as cellulose propionate and cellulose butyrate. As in the case of the acetate, the greater the degree of hydrolysis, the greater the increase of viscosity upon treatment with the dilute salt solution. For instance, a cellulose acetate propionate, which had been hydrolyzed for only 24 hours, and having a viscosity of 87 seconds gave a viscosity of 103 seconds upon treatment with calcium chloride solution while one that had been hydrolyzed for 48 hours and having a viscosity of 158 sec. was raised in viscosity to 250 sec. upon treatment with calcium chloride solution. Thus the increase in the degree of hydrolysis increased markedly the increase in the viscosity upon treatment with an aqueous solution of calcium chloride (0.1%).

In addition to calcium salts, such as calcium chloride or carbonate other alkaline earth metal salts, such as of strontium or barium might be employed to increase the viscosity of cellulose esters. Other salts of the alkaline earth metals such as for example the nitrate or the acetate or the bicarbonate might be employed for this purpose, if desired. Cellulose esters whose viscosities have been increased by my invention have been found to give a product of excellent properties. In uses where high viscosity esters are desirable, such as in the making of laminated glass, it may be desirable to raise the viscosity of the ester by incorporating a mineral salt therein before it is employed for that purpose.

The concentration of calcium or other suitable salt which may be employed to give the desired viscosity will vary depending on the salt, the ester to be treated and the viscosity desired. In the case of highly hydrolyzed esters, a solution containing only a few parts per million of calcium carbonate will incorporate sufficient of the salt therein to give a very high viscosity product.

I claim:

1. A process of increasing the viscosity of a partially hydrolyzed lower fatty acid ester of cellulose in solid form which comprises incorporating therein a small amount of an alkaline earth metal salt by means of an aqueous solution thereof containing .0003% to .1% of the salt.

2. A process of increasing the viscosity of a partially hydrolyzed lower fatty acid ester of cellulose in solid form which comprises thoroughly moistening the ester with an aqueous solution of an alkaline earth metal salt containing .0003% to .1% of the salt and thereupon drying the ester.

3. A process of increasing the viscosity of a partially hydrolyzed lower fatty acid ester of cellulose in solid form which comprises thoroughly moistening the ester with an aqueous solution of a calcium salt containing .0003% to .1% of the salt, removing the excess liquid therefrom and thereupon drying the ester.

4. A process of increasing the viscosity of a partially hydrolyzed lower fatty acid ester of cellulose in solid form which comprises soaking the ester in an aqueous solution of an alkaline earth metal salt containing .0003% to .1% of the salt, removing the excess solution therefrom and thereupon drying the ester.

5. A process of increasing the viscosity of a partially hydrolyzed cellulose acetate in solid form which comprises soaking the ester in an aqueous solution of an alkaline earth metal salt containing .0003% to .1% of the salt, removing the solution therefrom and thereupon drying the ester.

6. A process of increasing the viscosity of a partially hydrolyzed lower fatty acid ester of cellulose in solid form which comprises moistening the ester with an aqueous solution of calcium carbonate containing .0003% to .1% of the salt and thereupon drying the ester.

CARL J. MALM.